(12) United States Patent
Young

(10) Patent No.: US 7,697,802 B2
(45) Date of Patent: Apr. 13, 2010

(54) OPTICAL BYPASS METHOD AND ARCHITECTURE

(76) Inventor: Marvin R. Young, 4601 Deer Valley La., Richardson, TX (US) 75082

( * ) Notice: Subject to any disclaimer, the term of this patent is extended or adjusted under 35 U.S.C. 154(b) by 0 days.

(21) Appl. No.: 12/134,656

(22) Filed: Jun. 6, 2008

(65) Prior Publication Data

US 2009/0047012 A1 Feb. 19, 2009

Related U.S. Application Data

(60) Division of application No. 11/496,232, filed on Jul. 31, 2006, now Pat. No. 7,433,572, which is a division of application No. 11/146,436, filed on Jun. 6, 2005, now abandoned, which is a continuation of application No. 10/454,774, filed on Jun. 3, 2003, now Pat. No. 6,920,277.

(60) Provisional application No. 60/386,084, filed on Jun. 4, 2002.

(51) Int. Cl.
*G02B 6/35* (2006.01)

(52) U.S. Cl. .................. 385/16; 385/141; 385/142; 385/143; 385/11; 385/14; 385/15; 385/21; 385/20; 398/115; 398/126; 398/125; 398/127; 398/122; 398/118; 398/150

(58) Field of Classification Search .................. None
See application file for complete search history.

(56) References Cited

U.S. PATENT DOCUMENTS

| 4,229,831 | A | 10/1980 | Lacher | 398/214 |
|---|---|---|---|---|
| 4,535,459 | A | 8/1985 | Hogge, Jr. | 375/324 |
| 4,636,859 | A | 1/1987 | Vernhet et al. | 348/468 |
| 4,710,022 | A | 12/1987 | Soeda et al. | 356/73.1 |
| 5,224,183 | A | 6/1993 | Dugan | 385/24 |
| 5,225,922 | A | 7/1993 | Chraplyvy et al. | 398/94 |
| 5,267,071 | A | 11/1993 | Little et al. | 398/162 |
| 5,299,048 | A | 3/1994 | Suyama | 398/181 |
| 5,321,541 | A | 6/1994 | Cohen | 398/82 |
| 5,455,703 | A | 10/1995 | Duncan et al. | 398/136 |
| 5,559,625 | A | 9/1996 | Smith et al. | 398/66 |
| 5,600,466 | A | 2/1997 | Tsushima et al. | 398/79 |
| 5,613,210 | A | 3/1997 | Van Driel et al. | 455/45 |
| 5,726,784 | A | 3/1998 | Alexander et al. | 398/91 |
| 5,737,118 | A | 4/1998 | Sugaya et al. | 359/341.43 |
| 5,778,116 | A | 7/1998 | Tomich | 385/16 |
| 5,790,285 | A | 8/1998 | Mock | 398/21 |
| 5,812,290 | A | 9/1998 | Maeno et al. | 398/45 |
| 5,877,881 | A | 3/1999 | Miyauchi et al. | 398/193 |
| 5,903,613 | A | 5/1999 | Ishida | 375/340 |
| 5,914,794 | A | 6/1999 | Fee et al. | 398/20 |

(Continued)

FOREIGN PATENT DOCUMENTS

JP 01115230 5/1989

(Continued)

*Primary Examiner*—David A Vanore
(74) *Attorney, Agent, or Firm*—Woodcock Washburn LLP

(57) ABSTRACT

This invention pertains to optical fiber transmission networks, and is particularly relevant to transmission of high volume of data and voice traffic among different locations. In particular, the improvement teaches improvements to an optical transport system to allow for efficient and flexible network evolution.

43 Claims, 8 Drawing Sheets

U.S. PATENT DOCUMENTS

| | | | |
|---|---|---|---|
| 5,914,799 A | 6/1999 | Tan | 398/92 |
| 5,936,753 A | 8/1999 | Ishikawa | 398/72 |
| 5,940,209 A | 8/1999 | Nguyen | 359/341.1 |
| 5,963,350 A | 10/1999 | Hill | 398/70 |
| 5,995,694 A | 11/1999 | Akasaka et al. | 385/123 |
| 6,005,702 A | 12/1999 | Suzuki et al. | 398/185 |
| 6,021,245 A | 2/2000 | Berger et al. | 385/123 |
| 6,038,062 A | 3/2000 | Kosaka | 359/337 |
| 6,075,634 A | 6/2000 | Casper et al. | 398/139 |
| 6,078,414 A | 6/2000 | Iwano | 398/182 |
| 6,081,360 A | 6/2000 | Ishikawa et al. | 398/147 |
| 6,084,694 A | 7/2000 | Milton et al. | 398/83 |
| 6,088,152 A | 7/2000 | Berger et al. | 359/334 |
| 6,108,074 A | 8/2000 | Bloom | 356/73.1 |
| 6,122,095 A | 9/2000 | Fatehi | 359/337 |
| 6,151,334 A | 11/2000 | Kim et al. | 370/468 |
| 6,157,477 A | 12/2000 | Robinson | 398/147 |
| 6,160,614 A | 12/2000 | Unno | 356/73.1 |
| 6,160,942 A | 12/2000 | Watanabe | 385/122 |
| 6,163,392 A | 12/2000 | Condict et al. | 398/1 |
| 6,163,636 A | 12/2000 | Stentz et al. | 385/24 |
| 6,173,094 B1 | 1/2001 | Bowerman et al. | 385/24 |
| 6,177,985 B1 | 1/2001 | Bloom | 356/73.1 |
| 6,198,559 B1 | 3/2001 | Gehlot | 398/161 |
| 6,229,599 B1 | 5/2001 | Galtarossa | 356/73.1 |
| 6,236,481 B1 | 5/2001 | Laor | 398/9 |
| 6,236,499 B1 | 5/2001 | Berg et al. | 359/341.2 |
| 6,246,510 B1 | 6/2001 | BuAbbud et al. | 359/341.2 |
| 6,259,553 B1 | 7/2001 | Kinoshita | 359/337 |
| 6,259,554 B1 | 7/2001 | Shigematsu et al. | 359/337 |
| 6,259,693 B1 | 7/2001 | Ganmukhi et al. | 370/366 |
| 6,259,845 B1 | 7/2001 | Sardesai | 385/123 |
| 6,272,185 B1 | 8/2001 | Brown | 375/340 |
| 6,275,315 B1 | 8/2001 | Park et al. | 398/148 |
| 6,288,811 B1 | 9/2001 | Jiang et al. | 398/79 |
| 6,288,813 B1 | 9/2001 | Kirkpatrick et al. | 398/136 |
| 6,307,656 B2 | 10/2001 | Terahara | 398/139 |
| 6,317,231 B1 | 11/2001 | Al-Salameh et al. | 398/34 |
| 6,317,255 B1 | 11/2001 | Fatehi et al. | 359/341.44 |
| 6,323,950 B1 | 11/2001 | Kim et al. | 356/477 |
| 6,327,060 B1 | 12/2001 | Otani et al. | 398/83 |
| 6,331,906 B1 * | 12/2001 | Sharma et al. | 398/48 |
| 6,356,384 B1 | 3/2002 | Islam | 359/334 |
| 6,359,729 B1 | 3/2002 | Amoruso | 359/341.1 |
| 6,388,801 B1 | 5/2002 | Sugaya et al. | 359/334 |
| 6,396,853 B1 | 5/2002 | Humphrey et al. | 370/535 |
| 6,519,082 B2 | 2/2003 | Ghera et al. | 359/341.4 |
| 6,920,277 B2 | 7/2005 | Young | 385/144 |
| 2001/0005271 A1 | 6/2001 | Leclerc et al. | 398/102 |
| 2001/0007605 A1 | 7/2001 | Inagaki et al. | 385/123 |
| 2001/0009468 A1 | 7/2001 | Fee | 398/147 |
| 2001/0014104 A1 | 8/2001 | Bottorff et al. | 370/471 |
| 2002/0012152 A1 | 1/2002 | Agazzi et al. | 398/202 |
| 2002/0015220 A1 | 2/2002 | Papernyl et al. | 359/334 |
| 2002/0034197 A1 | 3/2002 | Tornetta et al. | 370/535 |
| 2002/0044317 A1 | 4/2002 | Gentner et al. | 398/178 |
| 2002/0044324 A1 | 4/2002 | Hoshida et al. | 359/337.13 |
| 2002/0048287 A1 | 4/2002 | Silvers | 370/535 |
| 2002/0051468 A1 | 5/2002 | Ofek et al. | 370/503 |
| 2002/0063948 A1 | 5/2002 | Islam et al. | 359/334 |
| 2002/0064181 A1 | 5/2002 | Ofek et al. | 370/477 |
| 2002/0075903 A1 | 6/2002 | Hind | 370/503 |
| 2002/0080809 A1 | 6/2002 | Nicholson et al. | 370/412 |

FOREIGN PATENT DOCUMENTS

JP      02238736      9/1990

* cited by examiner

Figure 1: Prior Art

OPTICAL BYPASS METHOD AND ARCHITECTURE

CROSS-REFERENCE TO RELATED APPLICATIONS

This application is a division of U.S. application Ser. No. 11/496,232, filed Jul. 31, 2006, which is a division of U.S. application Ser. No. 11/146,436, filed Jun. 6, 2005, which is a continuation of U.S. Pat. No. 6,920,277, issued Jul. 19, 2005, which claims benefit under 35 U.S.C. § 119(e) of Provisional U.S. Application No. 60/386,084, filed Jun. 4, 2002, the disclosures of which are hereby incorporated by reference in their entireties.

FIELD OF THE INVENTION

The present invention relates, in general, to the field of optical communications, and in particular to optical fiber transmission networks. The invention is particularly relevant to transmission of high volume of data and voice traffic among different locations. In particular, the invention teaches improvements to an optical transport system to allow for efficient and flexible network evolution. The invention teaches a method and architecture for bypassing a terminal site without affecting existing traffic.

BACKGROUND OF THE INVENTION

A goal of many modern long haul optical transport systems is to provide for the efficient transmission of large volumes of voice traffic and data traffic over trans-continental distances at low costs. Various methods of achieving these goals include time division multiplexing (TDM) and wavelength division multiplexing (WDM). In time division multiplexed systems, data streams comprised of short pulses of light are interleaved in the time domain to achieve high spectral efficiency, and high data rate transport. In wavelength division multiplexed systems, data streams comprised of short pulses of light of different carrier frequencies, or equivalently different wavelengths, are co-propagated in the same fiber to achieve high spectral efficiency, and high data rate transport.

The transmission medium of these systems is typically optical fiber. In addition there is a transmitter and a receiver. The transmitter typically includes a semiconductor diode laser, and supporting electronics. The laser is often a DFB laser stabilized to a specified frequency on the ITU frequency grid. The laser may be directly modulated with a data train with an advantage of low cost, and a disadvantage of low reach and capacity performance. In many long haul systems, the laser is externally modulated using a modulator. A single stage modulator is sufficient for a non-return-zero (NRZ) modulation format. A two stage modulator is typically used with the higher performance return-to-zero (RZ) modulation format. An example of a modulator technology is the Mach-Zehnder lithium niobate modulator. Alternatively, an electro-absorptive modulator may be used. After binary modulation, a high bit may be transmitted as an optical signal level with more power than the optical signal level in a low bit. Often, the optical signal level in a low bit is engineered to be equal to, or approximately equal to zero. In addition to binary modulation, the data can be transmitted with multiple (more than two) levels, although in current optical transport systems, a two-level binary modulation scheme is predominantly employed. The receiver is located at the opposite end of the optical fiber, from the transmitter. The receiver is typically comprised of a semiconductor photodetector and accompanying electronics.

Typical long haul optical transport dense wavelength division multiplexed (DWDM) systems transmit 40 to 80 10 Gbps (gigabit per second) channels across distances of 1000 to 6000 km in a single 30 nm spectral band. In a duplex system, traffic is both transmitted and received between parties at opposite end of the link. In a DWDM system, different channels operating at distinct carrier frequencies are multiplexed using a multiplexer. Such multiplexers may be implemented using array waveguide grating (AWG) technology or thin film technology, or a variety of other technologies. After multiplexing, the optical signals are coupled into the transport fiber for transmission to the receiving end of the link. The total link distance may in today's optical transport systems be two different cities separated by continental distances, from 1000 km to 6000 km, for example. To successfully bridge these distances with sufficient optical signal power relative to noise, the signal is periodically amplified using an in line optical amplifier. Typical span distances between optical amplifiers are 50-100 km. Thus, for example, 30 100 km spans would be used to transmit optical signals between points 3000 km apart. Examples of inline optical amplifiers include erbium doped fiber amplifiers (EDFAs) and semiconductor optical amplifiers (SOAs).

At the receiving end of the link, the optical channels are demultiplexed using a demultiplexer. Such demultiplexers may be implemented using array waveguide (AWG) technology or thin film technology, or a variety of other technologies. Each channel is then optically coupled to separate optical receivers.

Other common variations include the presence of post-amplifiers and pre-amplifiers just before and after the multiplexer and de-multiplexer. Often, there is also included dispersion compensation with the in line amplifiers. These dispersion compensators adjust the phase information of the optical pulses in order to compensate for the chromatic dispersion in the optical fiber while appreciating the role of optical nonlinearities in the optical fiber. Another variation that may be employed is the optical dropping and adding of channels at cities located in between the two end cities. The invention disclosed herein, would find application in any of these variations, as well as others.

Traditionally, optical transport systems are deployed in networks in order to provide connectivity among many cities on a continental or global basis. The selection of type and quantity of equipment is done according to a traffic demand schedule, and differences in demand, or changing demand will consequently change the optimum network design. Modern networks are characterized by large capital and operational costs and must be managed efficiently to be profitable in a competitive market. From a technological standpoint the efficient buildout of a network in a changing traffic demand environment is hampered by the flexibility of current optical transport equipment. There is a need for flexible optical transport systems that support optimal network designs under different traffic loads.

SUMMARY OF THE INVENTION

In the present invention, improvements to an optical transport system allow for efficient and flexible network evolution. More specifically, the invention teaches a method and architecture for bypassing a terminal site without affecting existing traffic.

In one embodiment of the invention, an architecture for optically bypassing a terminal site is taught.

In another embodiment of the invention, a method for optically bypassing a terminal site is taught.

In another embodiment of the invention, a means of upgrading a terminal site to behave effectively like an optical add-drop (OADM) site is taught.

BRIEF DESCRIPTION OF THE DRAWINGS

For a more complete understanding of the features and advantages of the present invention, reference is now made to the detailed description along with the accompanying figures in which corresponding numerals in the different figures refer to corresponding parts and in which.

DETAILED DESCRIPTION OF ILLUSTRATIVE EMBODIMENTS

While the making and using of various embodiments of the present invention are discussed in detail below, it should be appreciated that the present invention provides many applicable inventive concepts that can be embodied in a wide variety of specific contexts. The specific embodiments described herein are merely illustrative of specific ways to make and use the invention and do not delimit the scope of the invention.

Figure 1:
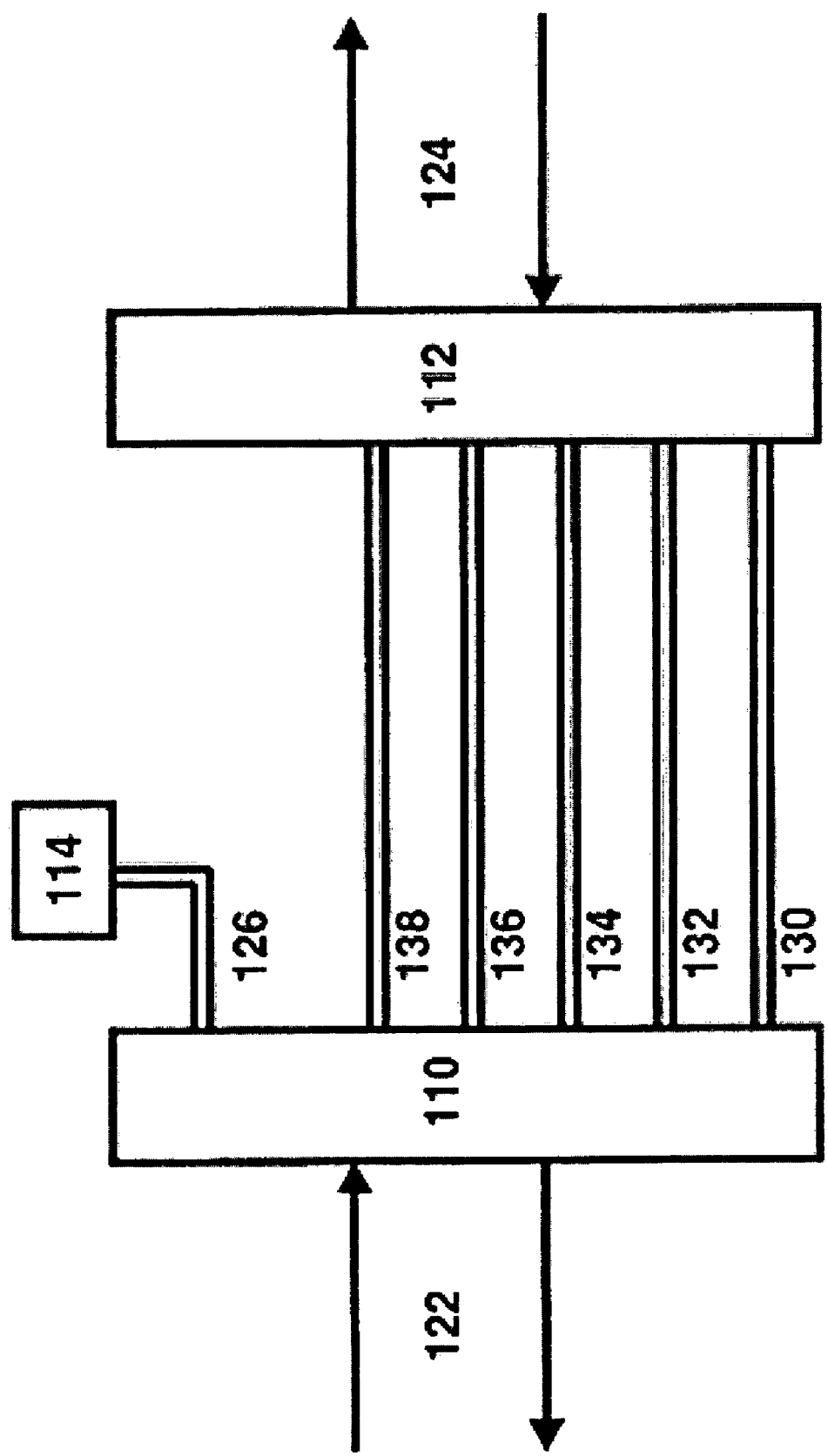
FIG. 1 is a schematic illustration of a prior art terminal site with an inefficient implementation of pass through traffic.

In FIG. 1 is shown a prior art block diagram of a terminal site of an optical communications network. In FIG. 1 is shown long haul fiber pair 122, terminal 110, terminal 112 and long haul fiber pair 124. Long haul fiber pair 122 and long haul fiber pair 124 are realized by cabled optical fiber such as SMF-28 or LEAF and provide media for transmitting long haul optical signals to adjacent network elements such as terminal sites, OADM sites, or amplifier sites. Terminal 110 and terminal 112 comprise a set of line cards including transceiver cards, amplifier cards, dispersion compensation cards multiplexer-demultiplexer cards, and other functional line cards. Terminal 110 provides optical to electrical termination of optical signals from long haul fiber pair 122. Terminal 110 also provides electrical to optical generation for electrical signals sent on long haul fiber pair 122. Terminal 112 provides optical to electrical termination from long haul fiber pair 124. Terminal 112 also provides electrical to optical generation for electrical signals sent on long haul fiber pair 124.

Also shown in FIG. 1 is local fiber patch cord pair 126 and local node element 114. Local node element 114 may comprise a local terminal that is part of a short haul, or metro system, or it may be a switch or router. Local fiber patch cord pair 126 is realized by a pair of connectorized jacketed optical fibers. A non-limiting representative length range of local fiber patch cord pair 126 is 10 m-10 km. Local fiber patch cord pair 126 provides the transmission media for optical signals between terminal 110 and local node element 114.

Also shown in FIG. 1 are pass through fiber patch cord pair 130, pass through fiber patch cord pair 132, pass through fiber patch cord pair 134, pass through fiber patch cord pair 136, and pass through fiber patch cord pair 138. Pass through fiber patch cord pair 130 is realized by a pair of connectorized jacketed optical fibers. A non-limiting representative length range of pass through fiber patch cord pair 130 is 10-100 m. Pass through fiber patch cord pair 132 is realized by a pair of connectorized jacketed optical fibers. A non-limiting representative length range of pass through fiber patch cord pair 132 is 10-100 m. Pass through fiber patch cord pair 134 is realized by a pair of connectorized jacketed optical fibers. A non-limiting representative length range of pass through fiber patch cord pair 134 is 10-100 m. Pass through fiber patch cord pair 136 is realized by a pair of connectorized jacketed optical fibers. A non-limiting representative length range of pass through fiber patch cord pair 136 is 10-100 m. Pass through fiber patch cord pair 138 is realized by a pair of connectorized jacketed optical fibers. A non-limiting representative length range of pass through fiber patch cord pair 138 is 10-100 m. The exact number of local fiber patch cord pairs and pass through fiber patch cord pairs is merely representative and non-limiting. The relative number of local fiber patch cord pairs to pass through fiber patch cord pairs is merely representative and non-limiting. Further, the number of local fiber patch cord pairs and pass through fiber patch cord pairs will change as the traffic in the network changes, over the lifetime of the system. Initially, terminal 110 will drop and add more traffic to local node element 114, than will be patched through to terminal 112. As the network grows, however, much of the traffic will end up patched through from terminal 110 to terminal 112. Modern transport equipment can support as many as 200 channels so the cost, management and routing of patch cords becomes problematic.

The invention seeks to eliminate pass through fiber patch cords in a network traffic flexible manner with no impact on the initial cost of the system. Further, since each fiber patch cord pair is connected to a transceiver card, the cost of said card will also be reduced or eliminated due to the benefits of the invention.

Figure 2:
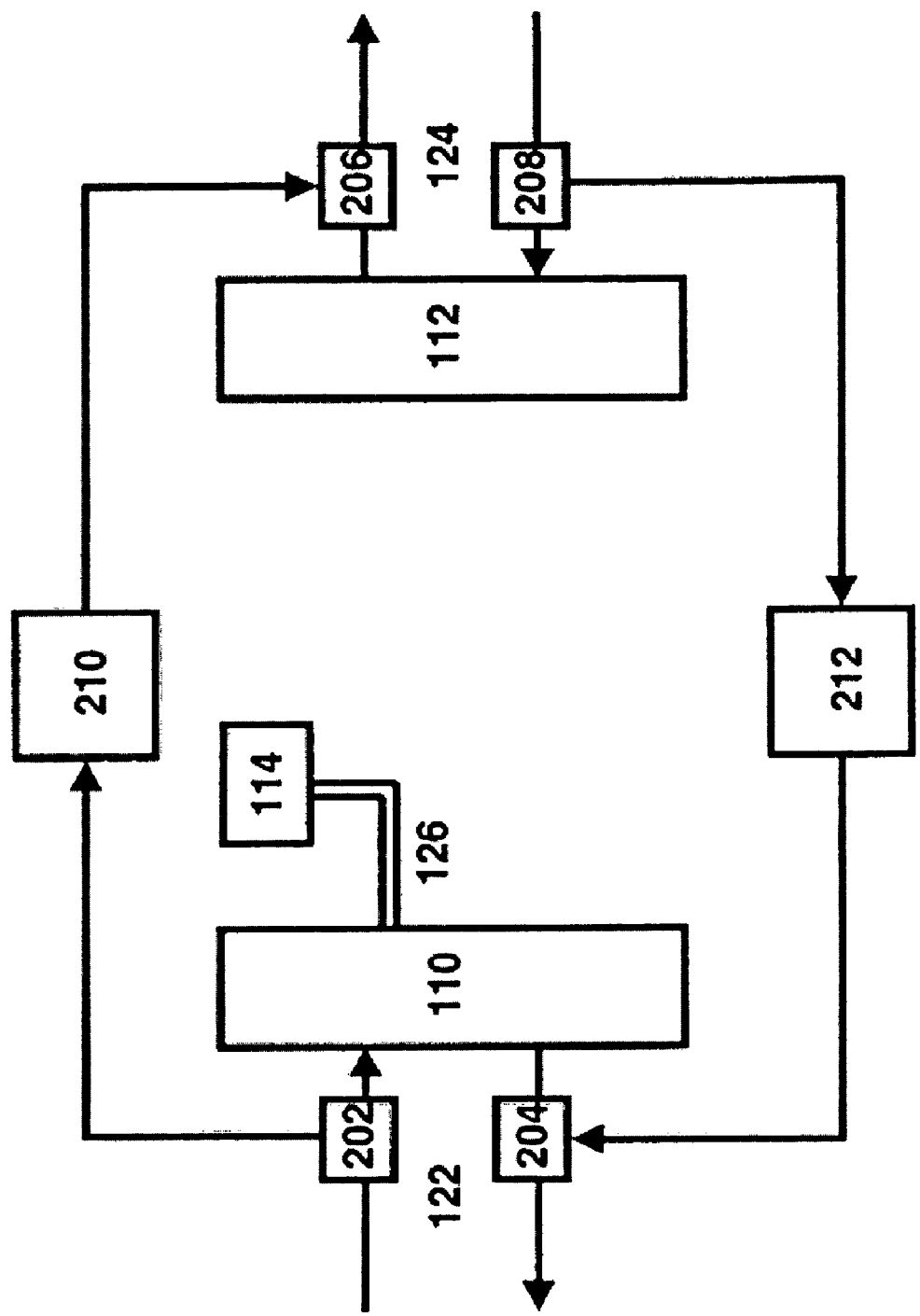
FIG. 2 is a schematic illustration of a terminal site with pass through traffic managed by an optical bypass switch in accordance with the invention.

In FIG. 2 is shown a schematic illustration of a terminal site with pass through traffic managed by an optical bypass switch in accordance with one aspect of the invention. Shown in FIG. 2 are optical splitter 202, optical combiner 204, optical combiner 206 and optical splitter 208. In a preferred embodiment, optical splitter 202 is realized by a thin film optical decoupler. In an alternate embodiment, optical splitter 202 is realized by a fused optical fiber decoupler. In a preferred embodiment, optical combiner 204 is realized by a thin film optical coupler. In an alternate embodiment, optical combiner 204 is realized by a fused optical fiber coupler. In a preferred embodiment, optical combiner 206 is realized by a thin film optical coupler. In an alternate embodiment, optical combiner 206 is realized by a fused optical fiber coupler. In a preferred embodiment, optical splitter 208 is realized by a thin film optical decoupler. In an alternate embodiment, optical splitter 208 is realized by a fused optical fiber decoupler.

Also shown in FIG. 2 is optical bypass switch 210 and optical bypass switch 212. In a preferred embodiment, optical bypass switch 210 is realized by a dynamic spectral equalizer. In a preferred embodiment, optical bypass switch 212 is realized by a dynamic spectral equalizer. Dynamic spectral equalizers, are commercially available and perform three basic functions. Firstly, dynamic spectral equalizers spectrally decompose the DWDM wavelengths (channels) on the input fiber into physically separate paths. Secondly, dynamic spectral equalizers provide channel by channel attenuation or extinguishing on a programmable and changeable basis. Thirdly, dynamic spectral equalizers spectrally recombine the non-extinguished channels onto a single output fiber.

The signal flow path of the invention may now be understood in reference to FIG. 2. An input DWDM signal propagating in long haul fiber pair 122 towards terminal 110 is split by optical splitter 202 so that a portion of the signal continues to propagate towards terminal 110 and the remaining portion propagates into optical bypass switch 210. Within optical bypass switch 210, the DWDM signal is decomposed by a diffraction grating or other spectral decomposition device. The separated channels are subsequently attenuated. The attenuation is set so that channel powers will be compatible with those channels that will be combined from the terminal in optical combiner 206. If a particular channel is to be transmitted from terminal 112, optical bypass switch 210 extinguishes that channel's wavelength. In normal mode of operation, if a particular channel is to be received in terminal 110 optical bypass switch 210 extinguishes that channel's wavelength. In broadcast mode of operation, if a particular channel is to be received in terminal 110 optical bypass switch 210 does not extinguish that channel's wavelength; however in this mode, terminal 112 may not transmit at this wavelength. The remaining channels are then recombined in optical bypass switch 210 and output optical bypass switch 210. The output signal is combined with the transmitted signals from terminal 112 in optical combiner 206.

The reverse signal flow is similar, and will now be disclosed explicitly. An input DWDM signal propagating in long haul fiber pair 124 towards terminal 112 is split by optical splitter 208 so that a portion of the signal continues to propagate towards terminal 112 and the remaining portion propagates into optical bypass switch 212. Within optical bypass switch 212, the DWDM signal is decomposed by a diffraction grating or other spectral decomposition device. The separated channels are subsequently attenuated. The attenuation is set so that channel powers will be compatible with those channels that will be combined from the terminal in optical combiner 204. If a particular channel is to be transmitted from terminal 110, optical bypass switch 212 extinguishes that channel's wavelength. In normal mode of operation, if a particular channel is to be received in terminal 112 optical bypass switch 212 extinguishes that channel's wavelength. In broadcast mode of operation, if a particular channel is to be received in terminal 112 optical bypass switch 212 does not extinguish that channel's wavelength; however in this mode, terminal 110 may not transmit at this wavelength. The remaining channels are then recombined in optical bypass switch 212 and output optical bypass switch 212. The output signal is combined with the transmitted signals from terminal 110 in optical combiner 204.

In a preferred embodiment optical bypass switch 210 and optical bypass switch 212 are combined in a single bidirectional optical bypass switch commercially sold as a bidirectional dynamic spectral equalizer.

This architecture and method of creating optical bypass of a terminal node allows for the recovery of expensive transceivers at a terminal site, regardless of when the terminal was deployed. The optical bypass architecture may be designed and deployed for a wide variety of existing equipment in current networks. The programmability of optical bypass switch 210 and optical bypass switch 212 eliminates detailed pre-planning of a network which leads to inefficiency.

An important aspect of this invention is that only optical splitter 202, optical combiner 204, optical combiner 206 and optical splitter 208 need be installed with the system at initial deployment. In this manner, optical bypass switch 210 and optical bypass switch 212 can be deployed in a non-traffic effecting manner at the point in time when a sufficient amount of bypass traffic exists.

Figure 3:
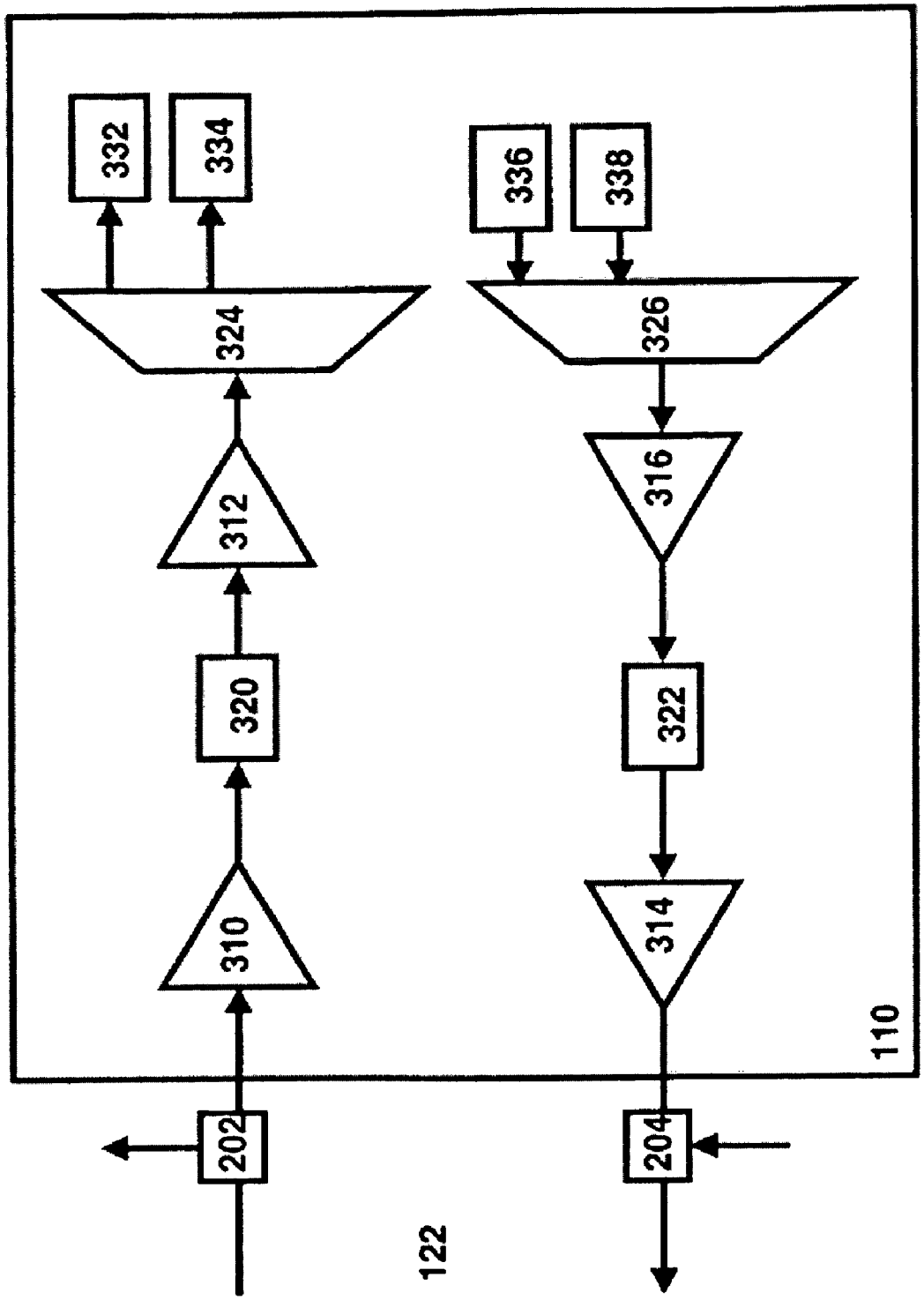
FIG. 3 is a schematic illustration of a terminal showing the connection location to the optical bypass switch in accordance with a preferred embodiment.

In FIG. 3 is shown a block diagram of certain components of terminal 110 and their arrangement relative to long haul optical fiber pair 122, optical splitter 202 and optical combiner 204. Shown in FIG. 3 are input first stage optical amplifier 310, input dispersion compensator 320, input second stage optical amplifier 312, demultiplexer 324, optical receiver 332 and optical receiver 334. Together, input first stage optical amplifier 310, input dispersion compensator 320, input second stage optical amplifier 312, demultiplexer 324, optical receiver 332 and optical receiver 334 comprise the receiving portion of terminal 110. Also shown in FIG. 3 are output first stage optical amplifier 316, output dispersion compensator 322, output second stage optical amplifier 314, multiplexer 326, optical transmitter 336 and optical transmitter 338. Together, output first stage optical amplifier 316, output dispersion compensator 322, output second stage optical amplifier 314, multiplexer 326, optical transmitter 336 and optical transmitter 338 comprise the transmitting portion of terminal 110. In a preferred embodiment input first stage optical amplifier 310, input second stage amplifier 312, output first stage optical amplifier 316 and output second stage optical amplifier 314 are realized by erbium doped fiber amplifiers (EDFAs). Input first stage optical amplifier 310, input second stage optical amplifier 312, output first stage optical amplifier 316 and output second stage optical amplifier 314 function to combat the impairment of attenuation that the optical signals encounter in long haul fiber pair 122. In a preferred embodiment, input dispersion compensator 320 and output dispersion compensator 322 are realized by specialty dispersion compensating fiber. Input dispersion compensator 320 and output dispersion compensator 322 function to combat the impairment of dispersion that the optical signals encounter in fiber pair 122. In a preferred embodiment optical receiver 332 and optical receiver 334 are realized with semiconductor photodetectors and high speed amplifying, filtering and decision electronics, as is well known in the art. In a preferred embodiment optical transmitter 336 and optical transmitter 338 are realized with semiconductor lasers modulators, biasing and drive electronics, as is well known in the art. The number of optical receivers and optical transmitters in FIG. 1 is not meant to be restrictive. Modern optical transport systems may comprise 200 optical receivers and the same number of optical transmitters. Further, as channel counts become high, additional optical amplifiers may also be deployed. It should also be noted that if optical splitter 202 and optical combiner 204 are applied to an existing terminal 110, then the internal arrangement of terminal 110 and even the presence of the components within terminal 110 may vary.

In FIG. 3, optical splitter 202 and optical combiner 204 are located outside and in close proximity to terminal 110. This location offers logistical advantages including ease of operation and installation. In alternate embodiments of this invention, alternate locations provide alternate advantages.

Figure 4:
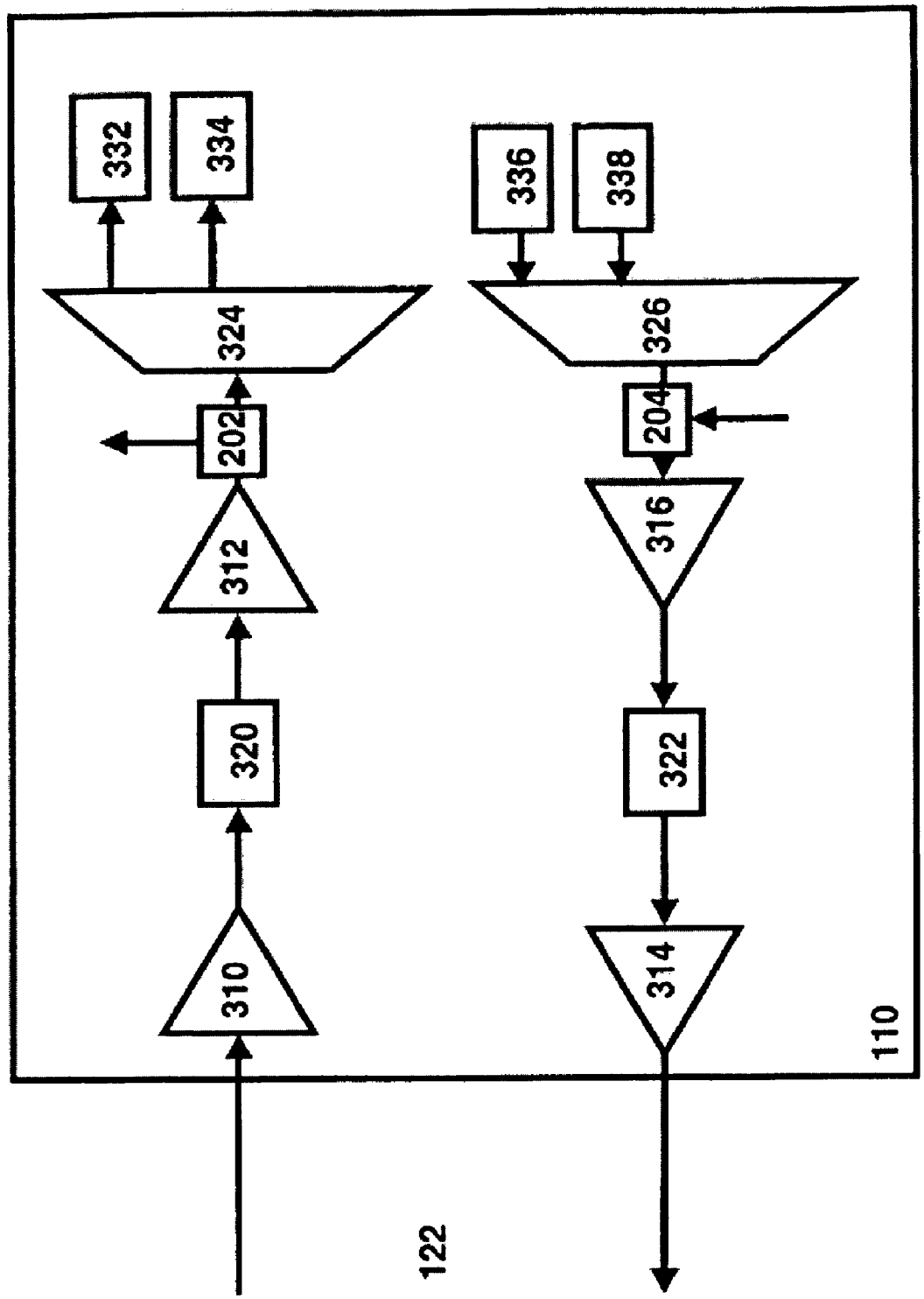
FIG. 4 is a schematic illustration of a terminal showing the connection location to the optical bypass switch in accordance with an alternate preferred embodiment.

Referring now to FIG. 4 for an alternate preferred embodiment of the invention, optical splitter 202 and optical combiner 204 are located in alternate locations internal to terminal 110. In this embodiment of the invention, input first stage optical amplifier 310, input second stage optical amplifier 312, output first stage optical amplifier 316 and output second stage optical amplifier 314 function to combat the approximate 3 dB loss associated with optical splitter 202 and optical combiner 204.

Figure 5:
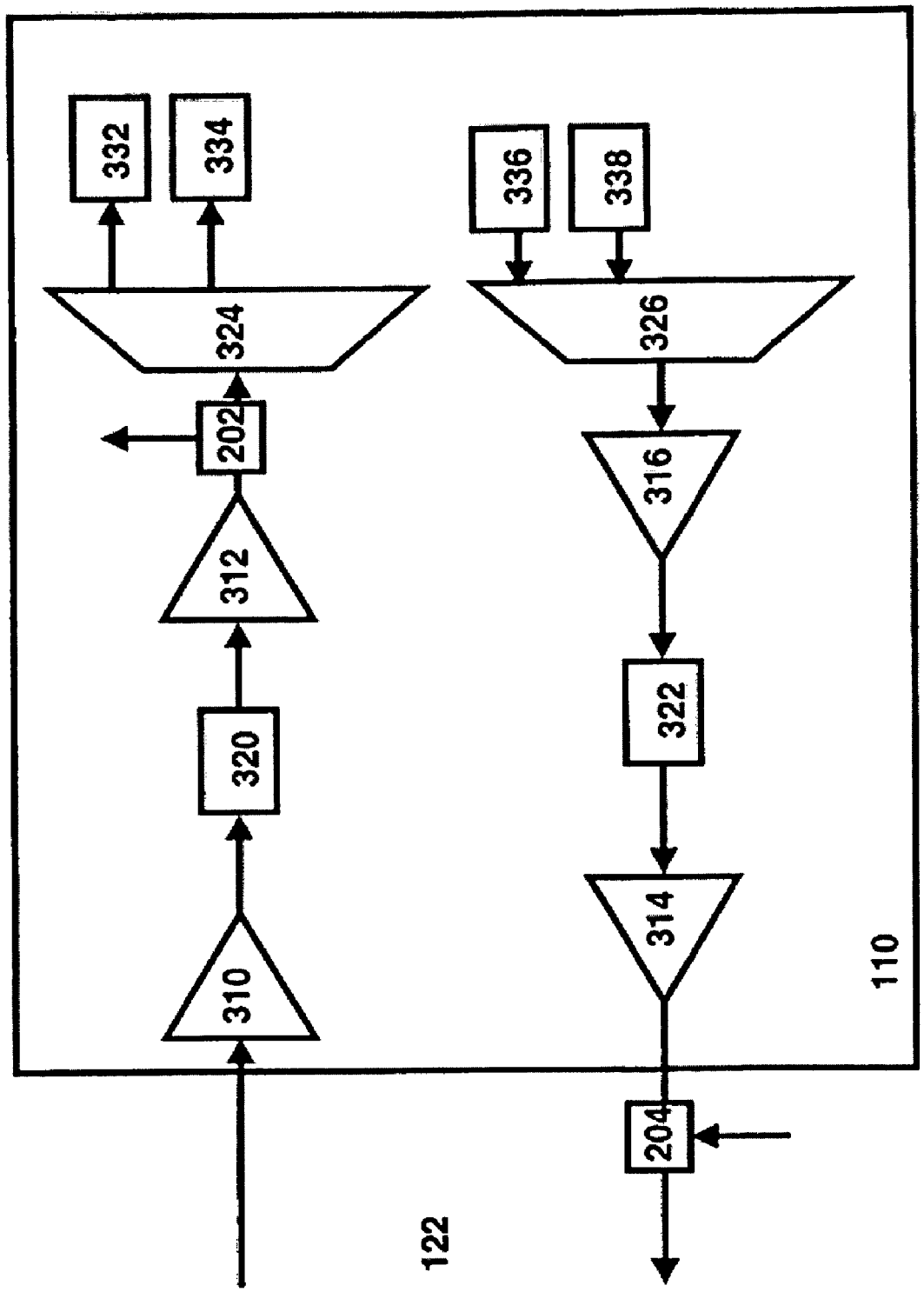
FIG. 5 is a schematic illustration of a terminal showing the connection location to the optical bypass switch in accordance with an alternate preferred embodiment.

Referring now to FIG. 5 for an alternate preferred embodiment of the invention, optical splitter 202 is located internal to terminal 110 after input first stage optical amplifier 310, input second stage optical amplifier 312 to allow input first stage optical amplifier 310, input second stage optical amplifier 312 to amplify the weak input optical signal arriving at terminal 110. Optical combiner 204 is located after output second stage optical amplifier 314. This embodiment allows for the correct dispersion compensation amount to be applied to the optical signals.

Figure 6:
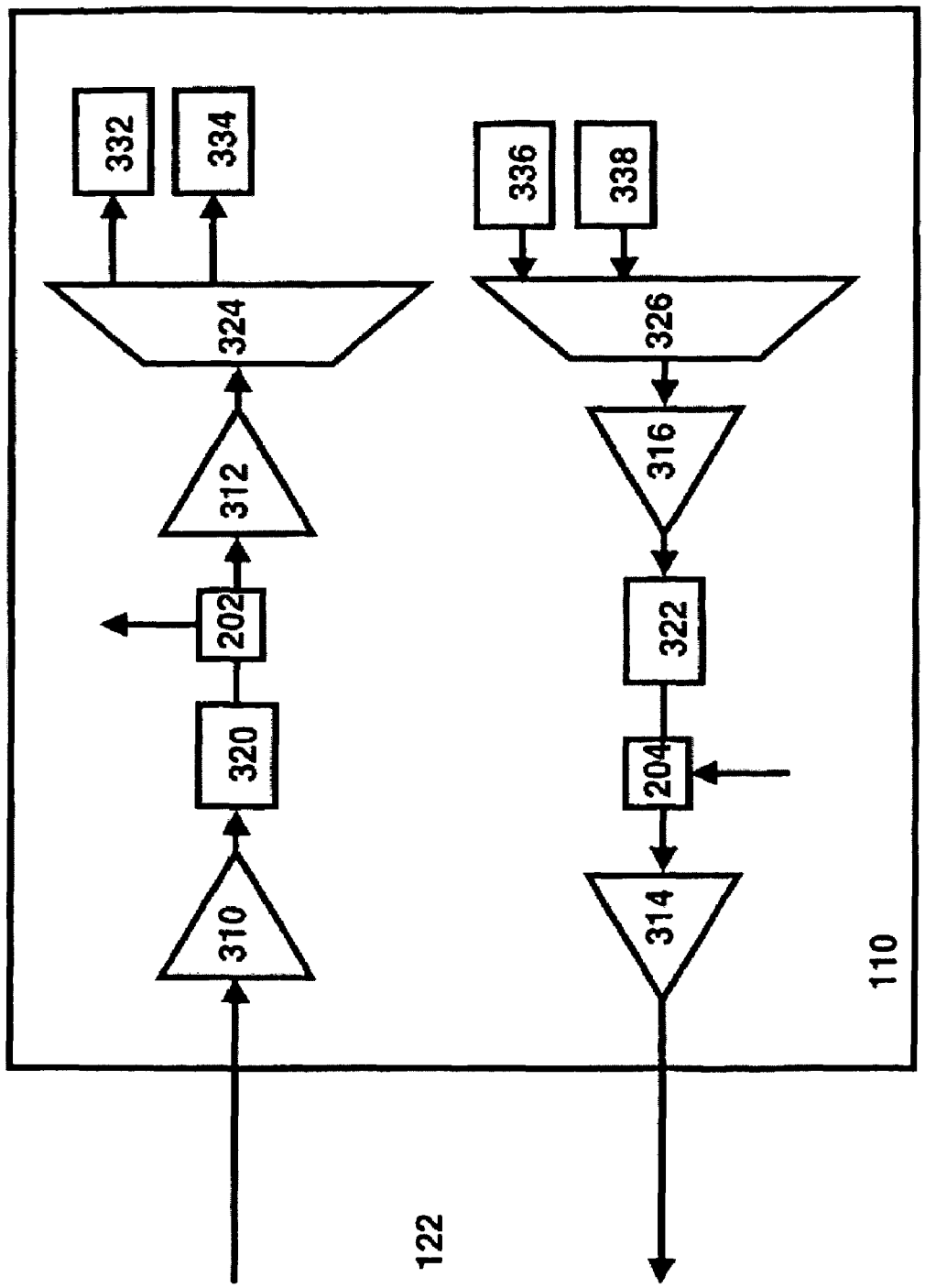
FIG. 6 is a schematic illustration of a terminal showing the connection location to the optical bypass switch in accordance with an alternate preferred embodiment.

Referring now to FIG. 6 for an alternate preferred embodiment of the invention, optical splitter 202 is located internal to terminal 110 after input dispersion compensator 320 and before input second stage optical amplifier 312. In this embodiment optical combiner 204 is located internal to terminal 110 after output dispersion compensator 320 and before output second stage optical amplifier 312. This embodiment allows for the correct dispersion compensation amount to be applied to the optical signals, with the smallest impact to system performance and no impact to terminal optical loss budget.

Figure 7:
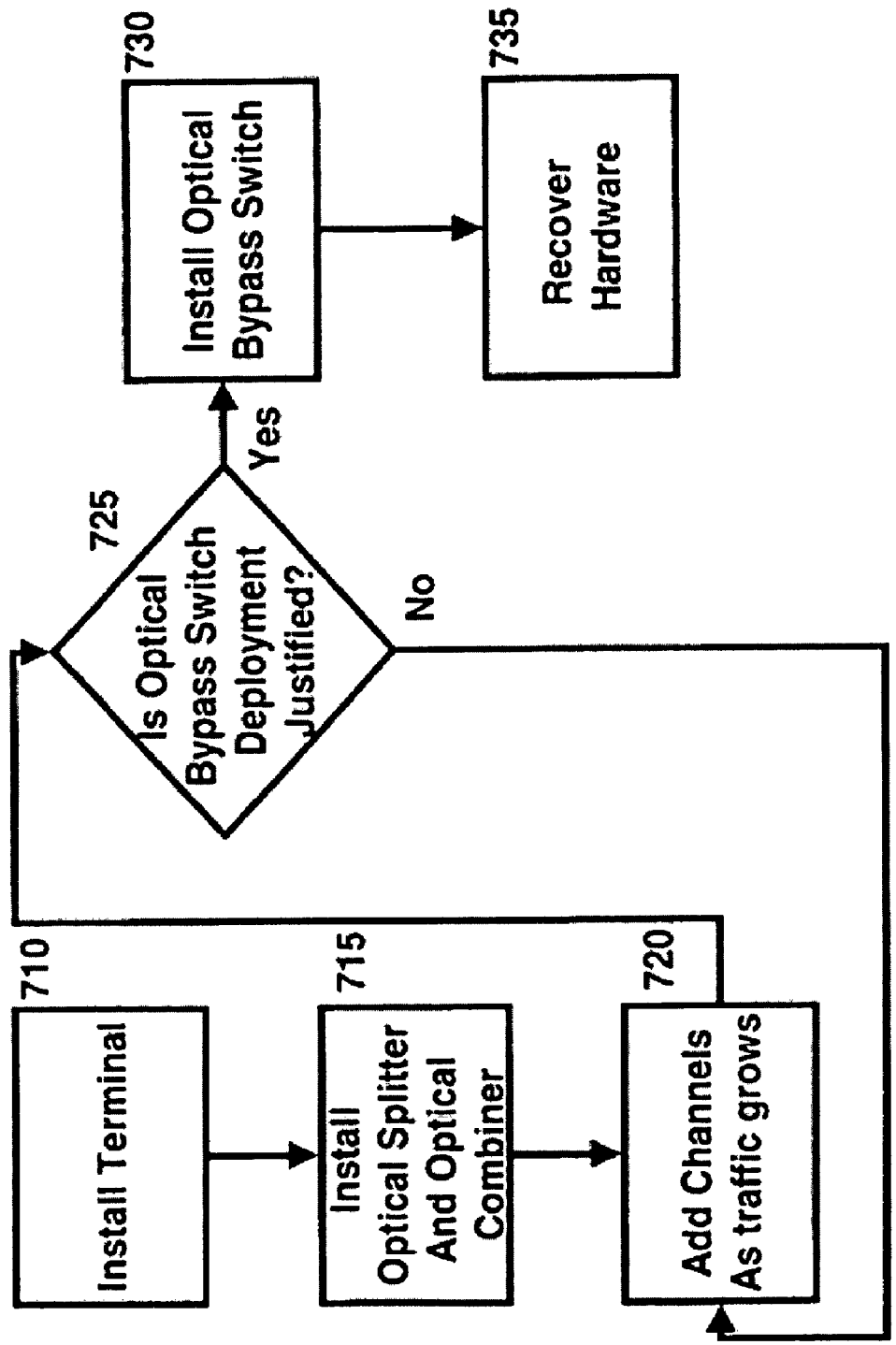
FIG. 7 is flowchart of a method of optically bypassing a terminal site in accordance with a preferred embodiment.

In FIG. 7 is shown a flow chart of a method for optically bypassing a terminal site is taught in accordance with the invention. In step 710, terminal 110 is installed at a terminal site in an optical network. In step 715, Optical splitter 202 and optical combiner 204 are installed in or in close proximity to terminal 110. In step 720, add channels to the network as traffic demand grows. In step 725, the decision is made whether optical bypass switch 210 and optical bypass switch 212 are justified economically. This decision is based on capital costs and discounted operational costs at the time of the decision. If the decision is negative, then no bypass switch is installed, until additional channels are added. If the decision is positive, then optical bypass switch 210 and optical bypass switch 212 are installed in step 730. In step 735, transceiver and other hardware may be recovered and redeployed elsewhere in the network.

Figure 8:
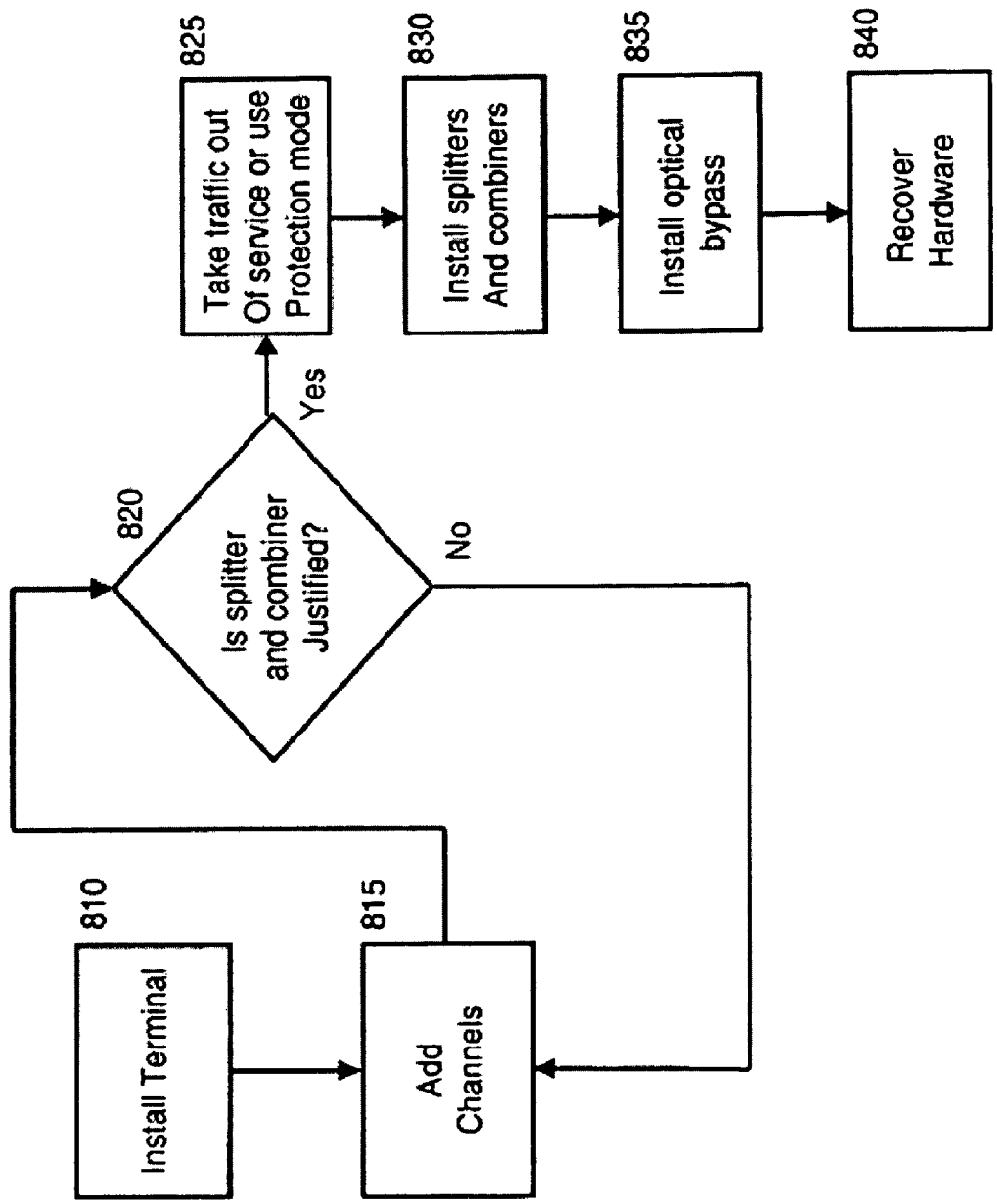
FIG. 8 is a flowchart of a method of evaluating the need for and installing optical splitters.

FIG. 8 shows a flow chart of a method for evaluating the need for installing optical splitters at a terminal site in accordance with the invention for which optical bypass was not originally envisioned. In step 810, terminal 110 is installed at a terminal site on an optical network. In step 815, channels are added in the normal course to the optical network as traffic grows. At step 820 an evaluation is made of the necessity for a splitter and optical bypass system. The decision is based on capital costs and discounted operational costs at the time of the decision. If the decision is negative, then no splitter is installed, until additional channels are added. If the decision is positive, then the splitter and optical combiner are installed in step 830. In step 835, the optical bypass switch is installed. In step 840 transceiver and other hardware may be recovered and redeployed elsewhere in the network.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed:

1. A system for optically bypassing a terminal, the system comprising:

an optical decoupler configured to split a first multiplexed optical signal into a first portion and a second portion;

an optical bypass switch coupled to the optical decoupler, wherein the optical bypass switch is configured to process the first portion of the first multiplexed optical signal to produce an output signal; and an optical coupler coupled to the optical bypass switch, wherein the optical coupler is configured to combine the output signal with a second multiplexed optical signal to produce a third multiplexed optical signal.

2. The system of claim 1, wherein the optical decoupler is configured to transmit the second portion of the first multiplexed optical signal to a terminal.

3. The system of claim 1, further comprising an amplifier and a demultiplexer, wherein the optical decoupler is coupled between the amplifier and the demultiplexer, and wherein the optical decoupler is configured to transmit the second portion of the first multiplexed optical signal to the demultiplexer.

4. The system of claim 1, further comprising a dispersion compensator and an amplifier, wherein the optical decoupler is coupled between the dispersion compensator and the amplifier, and wherein the optical decoupler is configured to transmit the second portion of the first multiplexed optical signal to the amplifier.

5. The system of claim 1, wherein the optical coupler is configured to receive the second multiplexed optical signal from a terminal.

6. The system of claim 1, further comprising a multiplexer and an amplifier, wherein the optical coupler is coupled between the multiplexer and the amplifier, and wherein the optical coupler is configured to transmit the third multiplexed optical signal to the amplifier.

7. The system of claim 1, further comprising a dispersion compensator and an amplifier, wherein the optical coupler is coupled between the dispersion compensator and the amplifier, and wherein the optical coupler is configured to transmit the third multiplexed optical signal to the amplifier.

8. The system of claim 1, wherein the optical bypass switch is configured to decompose the first portion of the first multiplexed optical signal to produce the output signal.

9. The system of claim 1, wherein the optical bypass switch is configured to attenuate the output signal so that one or more channel powers of the output signal is compatible with the second multiplexed optical signal.

10. The system of claim 1, wherein the optical bypass switch is configured to extinguish a channel of the first portion of the first multiplexed optical signal if the channel is to be transmitted by a terminal as part of the second multiplexed optical signal.

11. The system of claim 1, wherein the optical bypass switch is configured to extinguish a channel of the first portion of the first multiplexed optical signal if the channel is to be received by a terminal as part of the second portion of the first multiplexed optical signal.

12. The system of claim 1, wherein the optical bypass switch is configured to not extinguish any channels of the first multiplexed optical signal when operating in a broadcast mode.

13. The system of claim 1, wherein the system is bi-directional.

14. The system of claim 1, wherein the optical decoupler includes a thin film optical decoupler.

15. The system of claim 1, wherein the optical decoupler includes a fused optical decoupler.

16. The system of claim 1, wherein the optical coupler includes a thin film coupler.

17. The system of claim 1, wherein the optical coupler includes a fused optical coupler.

18. The system of claim 1, wherein the optical bypass switch includes a dynamic spectral equalizer.

19. The system of claim 1, wherein the system is bi-directional.

20. A system for optically bypassing a terminal, the system comprising:
    decoupling means for splitting a first multiplexed optical signal into a first portion and a second portion;
    bypass means for processing the first portion of the first multiplexed optical signal to produce an output signal; and
    coupling means for combining the output signal with a second multiplexed optical signal to produce a third multiplexed optical signal.

21. The system of claim 20, wherein the decoupling means further comprises means for transmitting the second portion of the first multiplexed optical signal to a terminal.

22. The system of claim 20, further comprising amplifying means for amplifying the first multiplexed optical signal and demultiplexing means for demultiplexing the second portion of the first multiplexed optical signal.

23. The system of claim 20, further comprising dispersion compensation means for compensating for dispersion in the first multiplexed optical signal and amplifying means for amplifying the second portion of the first multiplexed optical signal.

24. The system of claim 20, wherein the coupling means further comprises means for receiving the second multiplexed optical signal from a terminal.

25. The system of claim 20, further comprising multiplexing means for producing the second multiplexed optical signal and amplifying means for amplifying the third multiplexed optical signal.

26. The system of claim 20, further comprising dispersion compensation means for compensating for dispersion in the second multiplexed optical signal and amplifying means for amplifying the third multiplexed optical signal.

27. The system of claim 20, wherein the bypass means further comprises means for decomposing the first portion of the first multiplexed optical signal to produce the output signal.

28. The system of claim 20, wherein the bypass means further comprises means for attenuating the output signal so that one or more channel powers of the output signal is compatible with the second multiplexed optical signal.

29. The system of claim 20, wherein the bypass means further comprises means for extinguishing a channel of the first portion of the first multiplexed optical signal if the channel is to be transmitted by a terminal as part of the second multiplexed optical signal.

30. The system of claim 20, wherein the bypass means further comprise means for extinguishing a channel of the first portion of the first multiplexed optical signal if the channel is to be received by a terminal as part of the second portion of the first multiplexed optical signal.

31. The system of claim 20, wherein the bypass means further comprises means for not extinguishing any channels of the first multiplexed optical signal when operating in a broadcast mode.

32. A method for optically bypassing a terminal, the method comprising:
    splitting a first multiplexed optical signal into a first portion and a second portion;
    processing the first portion of the first multiplexed optical signal to produce an output signal that bypasses a first terminal; and
    combining the output signal with a second multiplexed optical signal to produce a third multiplexed optical signal.

33. The method of claim 32, further comprising transmitting the second portion of the first multiplexed optical signal to the first terminal.

34. The method of claim 32, further comprising amplifying the first multiplexed optical signal and demultiplexing the second portion of the first multiplexed optical signal.

35. The method of claim 32, further comprising compensating for dispersion in the first multiplexed optical signal and amplifying the second portion of the first multiplexed optical signal.

36. The method of claim 32, further comprising receiving the second multiplexed optical signal from a second terminal.

37. The method of claim 32, further comprising producing the second multiplexed optical signal and amplifying the third multiplexed optical signal.

38. The method of claim 32, further comprising compensating for dispersion in the second multiplexed optical signal and amplifying the third multiplexed optical signal.

39. The method of claim 32, wherein processing the first portion of the first multiplexed optical signal includes decomposing the first portion of the first multiplexed optical signal.

40. The method of claim 32, further comprising attenuating the output signal so that one or more channel powers of the output signal is compatible with the second multiplexed optical signal.

41. The method of claim 32, wherein processing the first portion of the first multiplexed optical signal includes extinguishing a channel of the first portion of the first multiplexed optical signal if the channel is to be transmitted by a second terminal as part of the second multiplexed optical signal.

42. The method of claim 32, wherein processing the first portion of the first multiplexed optical signal includes extinguishing a channel of the first portion of the first multiplexed optical signal if the channel is to be received by the first terminal as part of the second portion of the first multiplexed optical signal.

43. The method of claim 32, wherein processing the first portion of the first multiplexed optical signal includes not extinguishing any channels of the first multiplexed optical signal when operating in a broadcast mode.

* * * * *

UNITED STATES PATENT AND TRADEMARK OFFICE
CERTIFICATE OF CORRECTION

PATENT NO. : 7,697,802 B2  
APPLICATION NO. : 12/134656  
DATED : April 13, 2010  
INVENTOR(S) : Young Page 1 of 1

It is certified that error appears in the above-identified patent and that said Letters Patent is hereby corrected as shown below:

Column 6, lines 11-12, delete "long haul optical fiber pair 122," and insert -- long haul fiber pair 122, --.

Column 6, line 29, delete "input second stage amplifier 312," and insert -- input second stage optical amplifier 312, --.

Column 6, line 42, delete "fiber pair 122." and insert -- long haul fiber pair 122. --.

Column 9, line 54, in Claim 30, delete "comprise" and insert -- comprises --.

Signed and Sealed this
Tenth Day of May, 2011

David J. Kappos
*Director of the United States Patent and Trademark Office*